(No Model.)

C. CROOK.
ROLLER BEARING.

No. 580,660. Patented Apr. 13, 1897.

Witnesses:
E. B. Bolton
N. Stewart

Inventor:
Chas Crook

By J. O. Fowler, Jr.
his Attorney.

United States Patent Office.

CHARLES CROOK, OF BROOKLYN, NEW YORK.

ROLLER-BEARING.

SPECIFICATION forming part of Letters Patent No. 580,660, dated April 13, 1897.

Application filed October 28, 1896. Serial No. 610,358. (No model.)

*To all whom it may concern:*

Be it known that I, CHARLES CROOK, a citizen of the United States, and a resident of Brooklyn, in the county of Kings and State of New York, have invented a certain new and useful Roller-Bearing, of which the following is a specification.

My invention relates to that class of bearings provided with antifriction-rollers; and it has for its object the provision of a device applicable for use with axles, journals, shafting, and like structure that is so simple in construction and application, inexpensive to manufacture, and efficient and durable in practical use as to constitute an improvement upon what has already been accomplished in this class of bearings.

To attain the desired end, my invention consists in the construction, arrangement, and operation of parts herein set forth.

Figure 1:
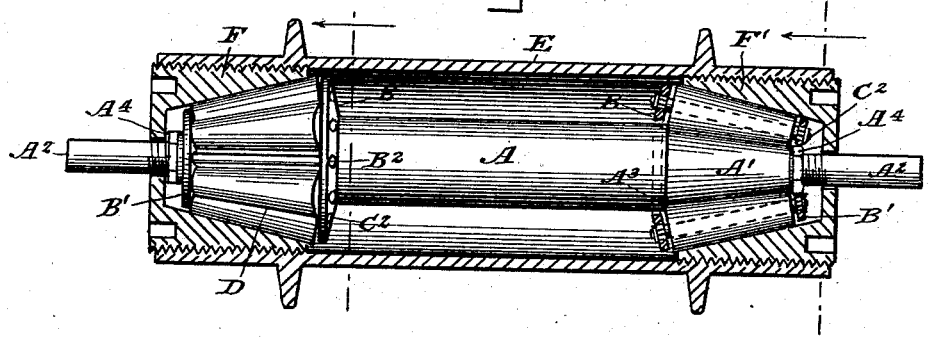
Figure 4:
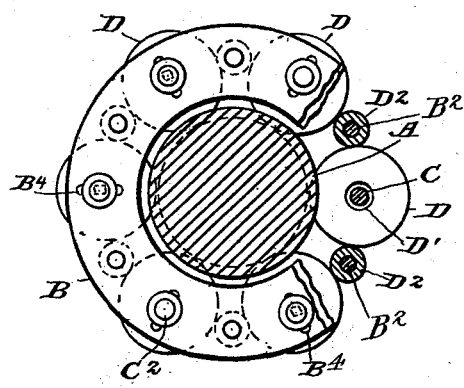
Figure 2:
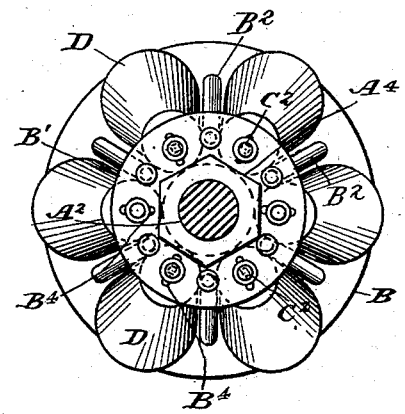
Figure 3:
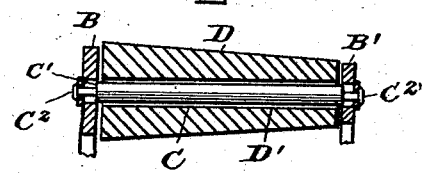

In the drawings which accompany and form part of this specification, Figure 1 represents a side elevation of a shaft provided with my invention. Fig. 2 is an end view of my rollers, and Figs. 3 and 4 are views in detail of my invention.

I have found it desirable to construct an adjustable antifriction-bearing which will run smoothly and easily, and in which the wear may be so taken up that there will be practically no variation or alteration of the relative wearing-surfaces of my bearing-frame from what the same was when new, and I have therefore constructed, according to my invention, an organization of the class described embodying the preferred construction of parts and their mutual relationship, combination, arrangement, and organization in a composite body or structure, as hereinafter described.

Referring particularly to the drawings, A denotes a horizontal shaft provided with beveled portions A' and terminating in smaller ends $A^2$. My laterally-adjustable jackets F F', the interior portions of which are inclined, are preferably so constructed that the bore of the same will become larger as it approaches the center of the shaft A. The jackets F F' are ordinarily exteriorly screw-threaded and are engaged with the interior of the tube E.

Upon the beveled portions of the shaft A, I place my detachable roller devices, consisting of rings or collars B B' and a series of conical or tapered rollers D, longitudinally bored, as at D', each roller D being supported by a pin C of smaller diameter than the bore of the roller D, the pin being provided with a shoulder C'. The pins C are slightly longer than the rollers D, in order to allow a little longitudinal play of the latter, and the ends of the pins C are passed through the practically vertical concave collars or rings B B' and enlarged at their extremities, as at $C^2$. Similar additional pins $B^2$, with or without rollers, may be used in order to stiffen the frame B B' C, although I sometimes dispense with these extra pins, as the frame for some usage is sufficiently rigid without the same.

It is manifest that various omissions of some particulars could be made without materially affecting the essential features of my invention or the operation of the remaining parts, and I do not, therefore, wish to be limited to the specific structural details of the organization herein set forth. Obviously the elements of the structure described may be located at an angle to the plane in which they are shown. I accordingly use the words "horizontal," "vertical," and the like in a relative sense.

In operation the roller devices are placed on the shaft A in the manner shown in the drawings. The rollers bear against the inclined surface of the jackets and the inclined surface of the shaft, thus preventing the wearing out of the pins C. Any wear of the conical or tapering rollers may be taken up and the parts adjusted by simply screwing up one of the jackets, as F', which operation will move my right-hand roller device, (the rollers of which abut the shoulders $A^3 A^4$ of the shaft A,) together with the shaft A, to the left, whereupon the opposite shoulder of the shaft A will move the left-hand roller device, consisting of collars or rings and intermediate rollers, farther within the jacket F.

I prefer to provide my rings or collars B B' with radial slots $B^4$, Fig. 4, and provide the end near the shoulder C' of my pin C with flat sides $C^4$ and make the bore D' small, so as to fit the pin snugly but freely. The pins $B^2$, which hold the collars rigidly in position, may also be provided with smaller conical or tapering rollers $D^2$ intermediate of the rollers D. The pins C are all inclined so as to point to a common center, and the rollers D are held in position by the shoulders $A^3$ with or without the use of the detachable shoulders $A^4$. My rollers are thus able to move out or in toward the center of the bearing, so as to prevent wear of the pin or outer portion of the roller-collar and are self-adjusting. The bevels on the shaft are slighter than in the bushings or sleeves F F', and the rollers will tend to crawl up the incline, but are held in position, as stated, by the shoulders of the shaft A, which abut the same on opposite sides thereof.

As stated, both of the sets of rollers may be adjusted by a single operation—namely, by simply screwing up one of the jackets. When the bearing is moved out of a horizontal position, the shoulders $A^4$ prevent the rollers from working out of their normal place and thus friction is avoided, which would prevent the rollers from working freely.

As it is evident that many changes in the construction and relative arrangement of parts might be resorted to without departing from the spirit and scope of my invention, I would have it understood that I do not restrict myself to the particular construction and arrangement of parts shown and described, but that such changes and also mechanical equivalents may be substituted therefor, and that

What I claim as my invention is—

1. A roller-bearing consisting of a duplex series of conical or tapering rollers, and of supporting-frames consisting of collars or rings and intermediate pins, in combination with a beveled shaft provided with two inclined portions and shoulders at the highest point of said inclines which lie opposite to each other, and with outer jackets each located near one end of the bearing and provided with oppositely-inclined conical bores, and also an inclosing tube for the whole.

2. A roller-bearing consisting of a duplex series of conical or tapering rollers, and of supporting-frames consisting of collars or rings and intermediate pins pointing to a common center, in combination with a beveled shaft provided with two inclined portions and shoulders at the highest point of said inclines which lie opposite to each other, and with outer adjustable jackets each located near one end of the bearing and provided with oppositely-inclined conical bores, and with adjusting means as exterior threads, and also with an inclosing tube for the whole, whereby both sets of rollers may be adjusted by the manipulation of only one of the said jackets.

3. A roller-bearing consisting of a duplex series of conical or tapering rollers, and of supporting-frames consisting of collars or rings and intermediate pins pointing to a common center, in combination with a shaft provided with a double incline and with shoulders at each end of each incline and with outer jackets each located near one end of the bearing and provided with oppositely-inclined conical bores, and also an inclosing tube for the whole.

4. A roller-bearing consisting of a duplex series of conical or tapering rollers and of rigid supporting-frames consisting of collars or rings and intermediate pins pointing to a common center and provided with smaller rollers, in combination with a beveled shaft provided with two inclined portions and shoulders at the highest point of said inclines which lie opposite to each other, and with outer jackets each located near one end of the bearing and provided with oppositely-inclined conical bores, and also an inclosing tube for the whole.

5. A roller-bearing consisting of a duplex series of conical or tapering rollers, and of supporting-frames consisting of collars or rings and intermediate pins, in combination with a beveled shaft provided with a double incline and with a pair of stationary inner shoulders, and a pair of detachable outer shoulders, and with outer jackets each located near one end of the bearing and provided with oppositely-inclined conical bores, and also an inclosing tube for the whole.

6. A roller-bearing consisting of a duplex series of conical or tapering rollers and of supporting-frames consisting of collars or rings provided with series of radial elongated slots and pins pointing to a common center, in combination with a beveled shaft provided with a double incline and with outer jackets each located near one end of the bearing and provided with oppositely-inclined conical bores, and also an inclosing tube for the whole.

7. A roller-bearing consisting of a duplex series of conical or tapering rollers and supporting-frames consisting of collars or rings provided with series of radial elongated slots and pins pointing to a common center, the ends of which are provided with flat sides, in combination with a beveled shaft provided with a double incline and with outer jackets each located near one end of the bearing and provided with oppositely-inclined conical bores, and also an inclosing tube for the whole.

In testimony of the foregoing specification I do hereby sign the same, in the city of New York, county and State of New York, this 12th day of October, A. D. 1896.

CHARLES CROOK.

Witnesses:
 J. ODELL FOWLER, Jr.,
 ABRAHAM PRESS.